United States Patent
Lakerdas et al.

[19]

[11] Patent Number: 5,970,925
[45] Date of Patent: Oct. 26, 1999

[54] TOTAL COOLING ASSEMBLY FOR I. C. ENGINE-POWERED VEHICLES

[75] Inventors: Andrew Lakerdas; Peter A. Kershaw; Alexander Joseph, all of London, Canada

[73] Assignee: Siemens Canada Limited, Mississauga, Canada

[21] Appl. No.: 09/128,899

[22] Filed: Aug. 4, 1998

Related U.S. Application Data

[62] Division of application No. 08/834,395, Apr. 16, 1997, which is a division of application No. 08/576,390, Dec. 21, 1995, Pat. No. 5,660,149.

[51] Int. Cl.⁶ .................................. F01P 5/12; F01P 7/10
[52] U.S. Cl. .................................. 123/41.11; 123/41.49; 165/DIG. 306; 165/DIG. 316
[58] Field of Search .................. 123/41.01, 41.12, 123/41.44, 41.49; 165/DIG. 306, DIG. 316

[56] References Cited

U.S. PATENT DOCUMENTS

| | | |
|---|---|---|
| 1,284,177 | 11/1918 | Camden . |
| 1,576,833 | 3/1926 | Larsen ..................................... 165/122 |
| 1,911,522 | 5/1933 | McIntyre . |
| 1,941,587 | 1/1934 | Stone et al. ................................ 165/86 |
| 1,992,795 | 2/1935 | Young . |
| 2,162,152 | 6/1939 | Wulle ....................................... 165/60 |
| 2,286,398 | 6/1942 | Young . |
| 2,420,436 | 5/1947 | Mallory . |
| 3,096,818 | 7/1963 | Evans . |
| 3,795,274 | 3/1974 | Fieni ....................................... 165/122 |
| 3,999,598 | 12/1976 | Fehr et al. ................................ 165/42 |
| 4,369,738 | 1/1983 | Hirayama ................................ 123/41.1 |
| 4,381,736 | 5/1983 | Hirayama ................................ 123/41.1 |
| 4,423,705 | 1/1984 | Morita et al. ........................ 123/41.02 |
| 4,434,749 | 3/1984 | Morita et al. ........................ 123/41.02 |
| 4,461,246 | 7/1984 | Clemente ............................... 123/41.12 |
| 4,475,485 | 10/1984 | Sakakibara et al. .................. 123/41.05 |
| 4,480,551 | 11/1984 | Gueyen ................................... 102/245 |
| 4,489,680 | 12/1984 | Spokas et al. ........................ 123/41.05 |

(List continued on next page.)

FOREIGN PATENT DOCUMENTS

| | | |
|---|---|---|
| 0584850 | 3/1994 | European Pat. Off. . |
| 3922814A1 | 4/1990 | Germany . |
| 004117214 | 12/1992 | Germany . |
| 4244037 | 6/1994 | Germany ............................. 123/41.49 |
| 4308002C1 | 8/1994 | Germany . |
| 3810174 | 9/1996 | Germany . |
| 03264723 | 11/1991 | Japan . |
| 07180554 | 7/1995 | Japan . |
| WP9014242 | 11/1990 | WIPO . |

*Primary Examiner*—Henry C. Yuen
*Assistant Examiner*—Brian Hairston

[57] ABSTRACT

A heat exchanger module, a cooling fan module, a pump/fan module, and an electronics system control module are joined together in assembly to form a total cooling assembly for an automotive vehicle that is powered by an internal combustion engine. The cooling fan module is disposed directly behind the rear face of the radiator, and contains an electric motor-driven fan that draws ambient air across the radiator. At time of installation in a vehicle, the assembly is "dropped into" the vehicle engine compartment and secured in place. An electric motor-driven coolant pump module that pumps engine coolant through the engine and radiator, and an electronics system control module that controls the operation of the fan and pump motors also mount on the cooling fan module. When the vehicle has an air conditioning system, and/or turbo-charged engine, one and/or two additional heat exchangers form part of the heat exchanger module. The cooling fan module may comprise an axial flow fan or a ducted radial flow fan.

17 Claims, 2 Drawing Sheets

U.S. PATENT DOCUMENTS

| | | | |
|---|---|---|---|
| 4,539,942 | 9/1985 | Kobayashi et al. | 123/41.1 |
| 4,557,223 | 12/1985 | Gueyen | 123/41.12 |
| 4,567,858 | 2/1986 | Hayashi | 123/41.13 |
| 4,685,513 | 8/1987 | Longhouse et al. | 123/41.49 |
| 4,691,668 | 9/1987 | West | 123/41.12 |
| 4,726,325 | 2/1988 | Itakura | 123/41.1 |
| 4,759,316 | 7/1988 | Itakura | 123/41.08 |
| 4,768,484 | 9/1988 | Scarselleta | 123/41.21 |
| 4,876,492 | 10/1989 | Lester et al. | 318/254 |
| 4,930,455 | 6/1990 | Creed et al. | 123/41.1 |
| 5,000,257 | 3/1991 | Shinmura | 165/140 |
| 5,002,019 | 3/1991 | Klaucke et al. | 123/41.49 |
| 5,021,185 | 6/1991 | McTaggart | 252/142 |
| 5,036,803 | 8/1991 | Nolting et al. | 123/41.44 |
| 5,046,554 | 9/1991 | Iwasaki et al. | 165/140 |
| 5,079,488 | 1/1992 | Harms et al. | 123/41.44 |
| 5,121,788 | 6/1992 | Carollo | 165/47 |
| 5,215,044 | 6/1993 | Banzhaf et al. | 123/41.29 |
| 5,219,016 | 6/1993 | Bolton et al. | 165/41 |
| 5,242,013 | 9/1993 | Couetoux et al. | 165/121 |
| 5,269,367 | 12/1993 | Susa et al. | 165/41 |
| 5,390,632 | 2/1995 | Ikebe et al. | 123/41.02 |
| 5,522,457 | 6/1996 | Lenz | 165/121 |
| 5,537,956 | 7/1996 | Rennfeld et al. | 123/41.29 |
| 5,577,888 | 11/1996 | Capdevilla et al. | 415/210.1 |
| 5,597,038 | 1/1997 | Potier | 165/121 |
| 5,619,957 | 4/1997 | Michels | 123/41.44 |
| 5,724,924 | 3/1998 | Michels | 123/41.12 |
| 5,758,716 | 6/1998 | Shibata | 165/41 |

TOTAL COOLING ASSEMBLY FOR I. C. ENGINE-POWERED VEHICLES

This application is a Divisional application of Ser. No. 08/834,395, filed Apr. 16, 1997, which is a Divisional application of Ser. No. 08/576,390, filed Dec. 21, 1995, now U.S. Pat. No. 5,660,149.

FIELD OF THE INVENTION

This invention relates to a total cooling assembly that comprises a novel organization and arrangement of discrete modules for performing both fluid circulation and heat rejection in an engine compartment of an internal combustion (I.C.) engine-powered automotive vehicle.

BACKGROUND AND SUMMARY OF THE INVENTION

An internal combustion engine requires heat rejection. Some internal combustion engines are air-cooled while others are liquid-cooled. Internal combustion engines that power automotive vehicles have been liquid-cooled in many cases. Such cooling is accomplished by an engine-driven coolant pump (commonly referred to as a water pump) mounted on the engine block and operated directly by the engine. The pump forces engine coolant through coolant passages in the engine, where the coolant absorbs engine heat, thence through a radiator, where heat is rejected, and finally back to the pump inlet to complete the fluid circuit. A fan that is driven either directly from the engine, or by an electric motor, is used in many cases to draw ambient air across the radiator so that heat is rejected at the radiator by transferring heat from the coolant to the ambient air, thus cooling the engine. A conventional thermostatic valve (commonly, a thermostat) controls the flow of pumped coolant through the radiator in relation to coolant temperature. The thermostat causes restriction of flow through the radiator until the coolant reaches sufficiently hot temperature to cause the thermostat to allow flow through the radiator so that the radiator may effectively limit engine temperature. In this way, the thermostat performs a form of coolant temperature regulation that establishes a desired operating temperature for the engine once the engine has fully warmed up while inherently allowing the coolant to heat more rapidly when the engine is started from a cooler condition.

U.S. Pat. Nos. 3,999,598; 4,475,485; 4,557,223; 4,567,858; 4,691,668; and 4,759,316 show internal combustion engine cooling systems in which heat is rejected by circulating engine coolant through coolant passages of a heat exchanger by using a pump, and in some cases, by also forcing ambient air across the heat exchanger by using an electric motor-driven fan or blower. In some of these patents the heat exchanger is the radiator of an internal combustion engine-powered automotive vehicle. U.S. Pat. Nos. 3,999,598 and 4,475,485 show that the heater core of the heater assembly, which heats the passenger compartment of such a vehicle, is also a heat exchanger through which engine coolant is circulated and across which air is forced by an electric motor-driven blower to deliver heated air to the passenger compartment. U.S. Pat. Nos. 3,999,598; 4,475,485; 4,557,223; and 4,691,668 also show the use of an electric motor to operate the pump that forces engine coolant through the heat exchanger.

The present invention relates to a new and unique total cooling assembly that has important advantages over prior cooling systems, one of the advantages being the facilitation of assembly operations at an automotive vehicle assembly plant.

Briefly, as applied to an engine cooling system, the assembly described herein comprises an assembly composed of several discrete modules: namely, a cooling fan module, an electric coolant pump module, an electronic systems control module, and a heat exchanger module. The cooling fan module is disposed downstream of the heat exchanger module and comprises an electric motor-driven fan for drawing air across the heat exchanger module, so that heat can be continually transferred from the heat exchanger module to the air stream thereby forming the effluent. The electric coolant pump module comprises an electric motor-driven coolant pump for pumping coolant through the engine coolant passages and the total cooling assembly. The electronic systems control module comprises electrical circuitry that receives various inputs and processes those inputs to control the operation of the electric motors of both the coolant pump and the fan. The heat exchanger module comprises a radiator. When the vehicle has an air conditioning system for cooling the passenger compartment, it also comprises an air conditioning condenser in tandem with the radiator; when the vehicle engine is turbo-charged, the heat exchanger module also comprises a charge air cooler. Optionally, an auxiliary cooling fan module may be disposed upstream of the heat exchanger module for creating head pressure across the upstream face of the heat exchanger module.

Another advantage of the invention, as applied to an internal combustion engine, is the elimination of an engine-mounted coolant pump that is driven directly from the engine crankshaft, usually by means of a belt and sheave. This may reduce the volume of the engine's packaging envelope, which may be a significant factor for engine compartment packaging in the design of a new automotive vehicle. The elimination of a belt and sheave reduces the number of engine parts and at the same time eliminates wear problems created by belt side loads on coolant pump shaft bearings. Since an engine-mounted coolant pump that is driven directly by the engine inherently relates the pumped coolant flow rate to engine speed (i.e., engine r.p.m.), such a pump may waste engine power and/or create pump cavitation at times when the coolant flow rate does not have to be as high as the rate to which it is forced by engine r.p.m.

Still another advantage of the invention is the elimination of an engine-driven fan for drawing air across the radiator. This may also reduce the engine's packaging envelope, and eliminate the need for certain engine-mounted parts. Since a fan that is driven directly by the engine draws power from the engine, such a fan may waste engine power at times when ram air flow across the radiator is present.

Further advantages, benefits, features, and utilities of the invention will be disclosed and/or perceived by a reading of the ensuing description and claims, which are accompanied by drawings. The drawings disclose a presently preferred embodiment of the invention according to the best mode contemplated at this time for carrying out the invention.

DESCRIPTION OF THE PREFERRED EMBODIMENT

Figure 1:
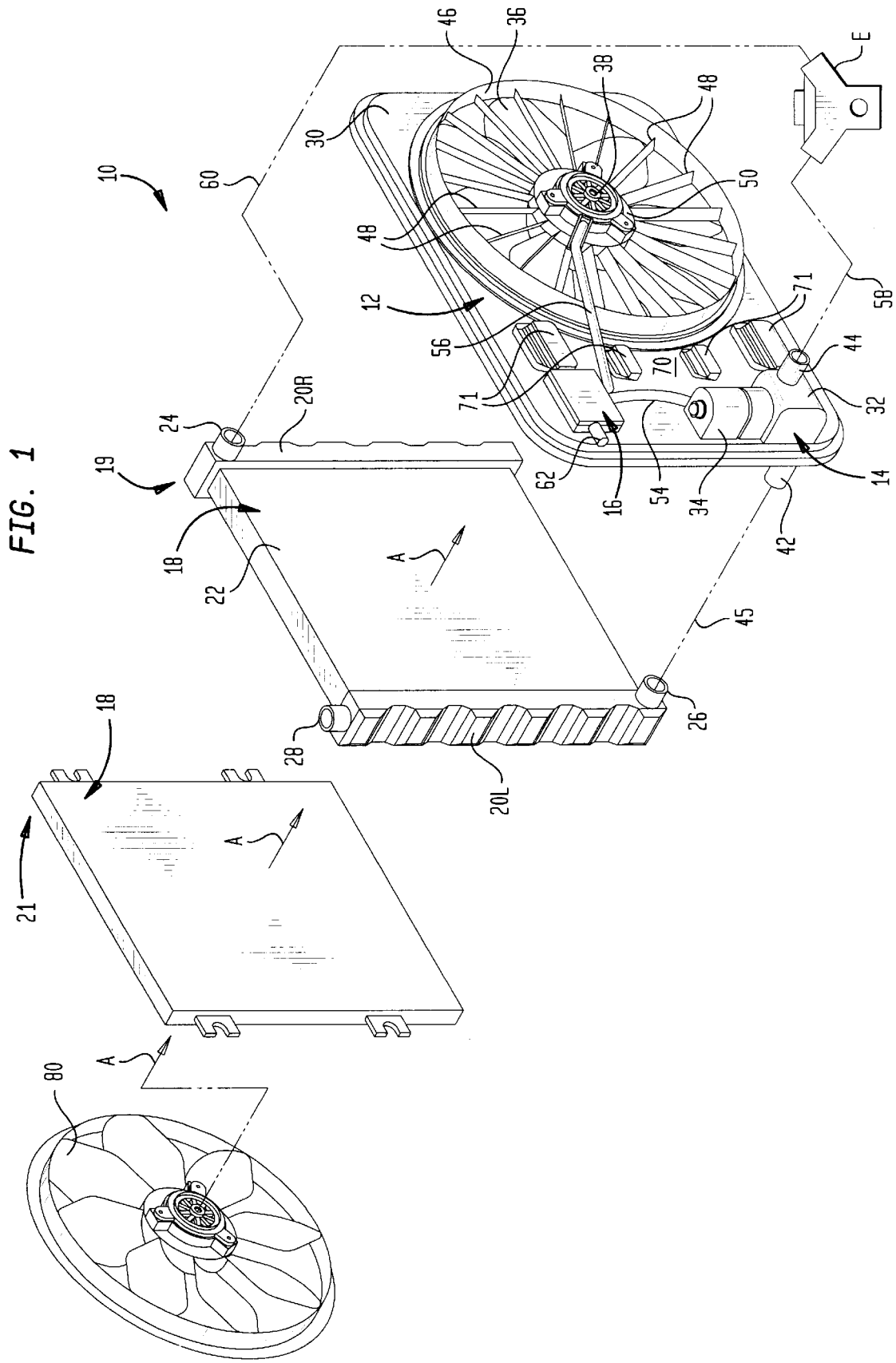
FIG. 1 is an exploded perspective view of a first exemplary embodiment of total cooling assembly embodying principles of the present invention.

FIG. 1 shows an exemplary total engine cooling assembly 10 for an internal combustion engine, the engine being schematically illustrated and designated by the letter E. In an exploded perspective view from the upper left rear, cooling assembly 10 is shown to comprise a cooling fan module 12, an electric coolant pump module 14, an electronic systems control module 16, and a heat exchanger module 18. In operative association, such as in the front portion of a front engine compartment of an automotive vehicle powered by engine E, these four modules 12, 14, 16, 18 are joined together in assembly by suitable joining means, such as fasteners, to form a total cooling assembly.

Heat exchanger module 18 comprises a radiator 19 and an air conditioning condenser 21 disposed in tandem. Radiator 19 is conventional, comprising right and left side header tanks 20R, 20L and a core 22 disposed between the two side header tanks. Right side header tank 20R is the inlet tank and comprises a rearwardly projecting inlet tube 24 near its upper end while left side header tank 20L is the outlet tank and comprises a rearwardly projecting outlet tube 26 near its lower end. A filler neck 28 is disposed on the top wall of tank 20L, and in the operative system, is closed by a removable radiator cap (not shown).

Cooling fan module 12 comprises panel structure 30 having a vertical and horizontal expanse generally corresponding to the respective vertical and horizontal expanses of heat exchanger module 18. The illustrated panel structure is basically a walled panel having vertical and horizontal expanse. Both electric coolant pump module 14 and electronic systems control module 16 are securely removably mounted on panel structure 30, near its left vertical edge in the exemplary embodiment. Electric coolant pump module 14 comprises a coolant pump 32 and an electric motor 34 for operating pump 32. Cooling fan module 12 comprises a fan 36 and an electric motor 38 for operating fan 36. Coolant pump 32 comprises an inlet tube 42 and an outlet tube 44. Inlet tube 42 is in liquid communication with radiator outlet 26 by a coupling tube, or connector, 45. A pump shaft that operates the internal pumping mechanism of pump 32 is coupled to a shaft of motor 34 by a suitable coupling.

Fan 36 comprises a central hub that is coupled to a shaft of motor 38 by a suitable coupling so that the fan's axis of rotation is coincident with the motor shaft axis. Fan 36 is disposed concentrically within a surrounding circular-walled through-opening 46 of panel structure 30. A configuration of struts 48 extends from the wall of through-opening 46 to a central motor mount 50 on which the body of motor 38 is mounted such that the motor shaft extends forward of the motor body concentric with opening 46 for concentric coupling with fan 36. This embodiment describes an axial flow fan.

In a vehicle that is equipped with an air conditioning system for the passenger compartment, air conditioning condenser 21 is disposed in tandem with radiator 12, typically in front of radiator 19. Radiator 19 and condenser 21 are each a heat exchanger for the respective system of which each is a part, serving to reject heat to ambient air. Engine coolant, in the case of the engine cooling system, and refrigerant, in the case of the air conditioning system, flow through passageways in their respective heat exchangers while ambient air flows across the passageways from the front face to the rear face of heat exchanger module 18 in the direction of arrows A in FIG. 1, passing successively through the condenser and the radiator. Each heat exchanger typically is constructed with fins, corrugations, or other means to increase the effective heat transfer surface area of the passageway structure for increasing heat transfer efficiency. The flow of ambient air across the heat exchanger module forms an effluent stream, with such flow being caused either by the operation of fan 36 by motor 38 to draw air across the heat exchanger module, or by ram air effect when the vehicle is in forward motion, or a combination of both.

Electronic systems control module 16 receives electric power from the vehicle electrical system and also various signals from various sources. Module 16 comprises electronic control circuitry that acts upon these signals to control the operation of electric motors 34, 38, and thereby control the operation of coolant pump 32 and fan 36. Examples of such signal sources include temperature and/or pressure sensors located at predetermined locations in the respective cooling and air conditioning systems, and/or data from an engine management computer, and/or data on an electronic data bus of the vehicle's electrical system. The electronic control circuitry of module 16 processes such signals and/or data from these various sources to operate the pump and fan such that the temperature of coolant, in the case of the engine cooling system, and the pressure of refrigerant, in the case of the air conditioning system, are regulated to desired temperature and pressure respectively.

Motors 34, 38 are typically D.C. motors for compatibility with the typical D.C. electrical system of an automotive vehicle. The electric current flow to each motor is controlled by respective switches, solid-state or electromechanical, which are operated by module 16, and may be internal to that module. FIG. 1 shows electric wiring 54, 56 leading from module 16 to the respective electric motor 34, 38.

The modules that constitute the exemplary embodiment form an assembly, which is installed in a vehicle by "dropping" it into the vehicle engine compartment and securing it in place. Various connections are then made, such as connecting hoses 58, 60 from pump outlet 44 and tank inlet 24 respectively to engine E, and connecting module 16 with the vehicle electrical system and various signal sources mentioned above, such as through an electric connector 62 extending from module 16.

The illustrated embodiment of FIG. 1 operates to pump engine coolant from pump outlet 44, through hose 58 into engine E where the coolant passes through coolant passages to absorb engine heat, thence through hose 60 to radiator 19 where heat is rejected, and thence back through connector 45 to pump inlet 42. The front face of panel structure 30 confronts the rear face of radiator 19 and is preferably shaped with a perimeter flange for mating fit to the rear face of radiator 19 to create maximum air draw across heat exchanger module 18 by minimizing air draw that does not pass across the heat exchanger module. Panel structure 30 is generally imperforate except for through-opening 46, and hence comprises a wall 70 on which modules 14 and 16 are mounted to one side of the through-opening. Wall 70 is designed to provide for appropriate accommodation of any particular designs of modules 14 and 16. Depending upon design considerations, such panel structure can be fabricated in various ways. One way is by injection molding suitable plastic to create a single panel in which walled through-opening 46, struts 48, and motor mount 50 are integrally formed. Another way is by using a sheet molding compound and process. The FIG. 1 embodiment also shows wall 70 to comprises a vertical row of flapper doors 71 that are normally closed, but which open when ram air pressure exceeds a certain value so that flow can take place through them. This may allow operation of the fan motor to be discontinued, saving energy.

Because module 16 operates fan 36 and pump 32 at speeds based on cooling requirements rather than engine r.p.m., engine power is used more efficiently to contribute to improved fuel economy. And as noted earlier, certain engine-mounted parts can be eliminated, also eliminating related wear problems. The total cooling assembly may be tested before it is assembled into a vehicle to assure proper function, and as mentioned earlier, the creation of such an assembly facilitates installation into a vehicle engine compartment by reducing the number of operations required at a vehicle assembly plant.

FIG. 1 also shows a portion of an auxiliary cooling fan module 80 that may be disposed upstream of heat exchanger module 18, optionally as part of the total cooling assembly, for creating head pressure across the upstream face of the heat exchanger module. Both fan modules 12 and 80 show axial flow type fans, and their electric motors are under the control of module 16.

Figure 2:
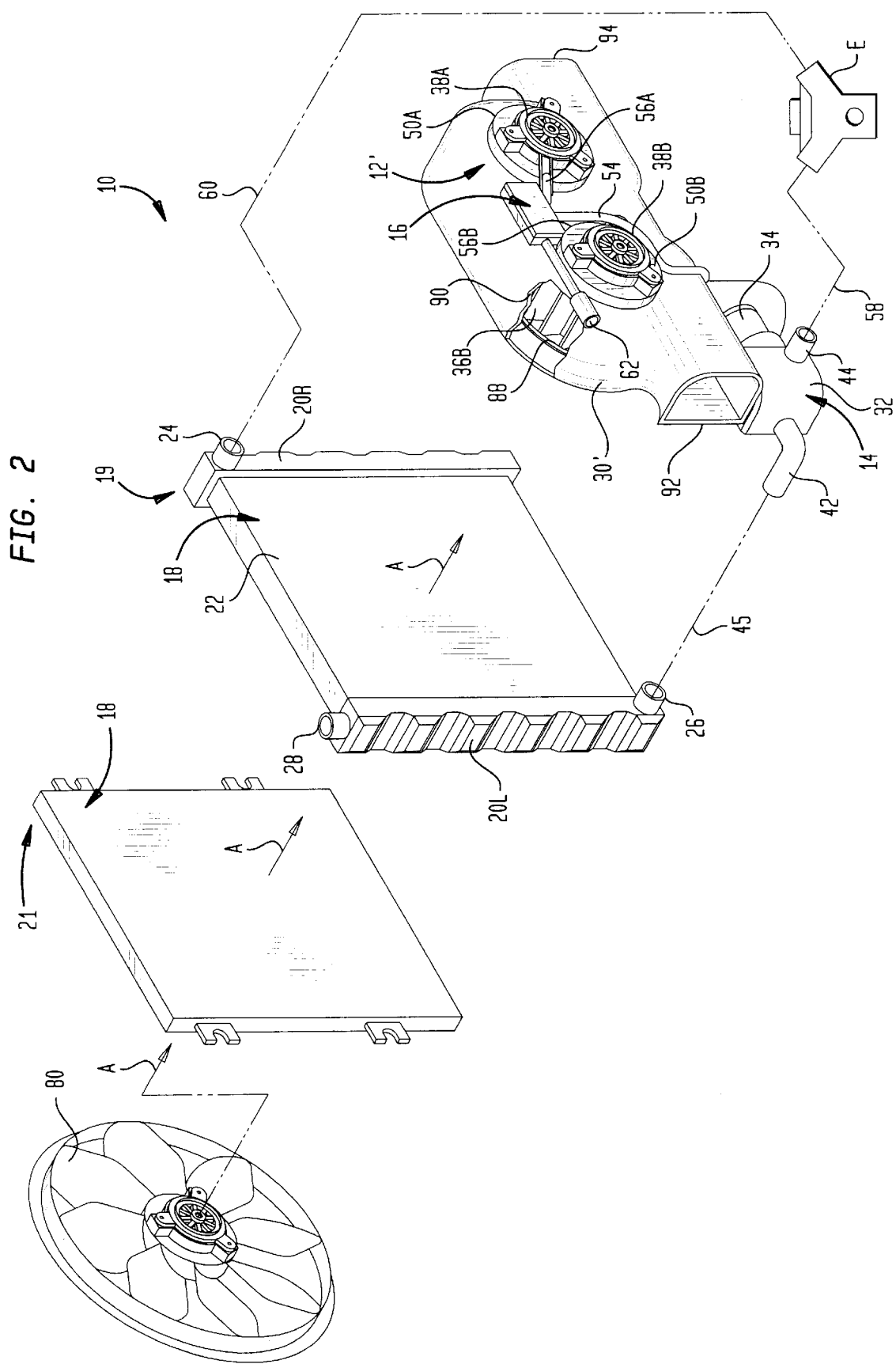
FIG. 2 is an exploded perspective view of a second exemplary embodiment of total cooling assembly embodying principles of the present invention.

FIG. 2 shows a second embodiment in which components corresponding to those of the first embodiment are designated by like reference numerals. This embodiment differs in that its cooling fan module 12' comprises dual ducted radial fans, as in commonly assigned U.S. Pat. No. 4,979,584, rather than an axial fan, as in FIG. 1. The panel structure 30' of module 12' comprises a dual ducted shroud having dual, side-by-side, frontal openings that face the rear of heat exchanger module 18. Each frontal opening is disposed behind essentially one-half of the heat exchanger module. The shroud's interior is shaped to provide dual, side-by-side ducted shroud spaces within which a respective radial fan wheel is disposed. FIG. 2 shows a portion of the ducted shroud wall broken away to reveal a portion of the frontal opening 88, the ducted shroud space 90, and the radial fan wheel 36B for the left ducted fan. The shroud comprises a side discharge outlet 92 from space 90. The right ducted fan also comprises a radial fan wheel within its ducted shroud space behind its frontal opening, and a side discharge outlet 94, but is constructed and operates essentially as a mirror image of the left ducted fan.

The rear wall of shroud 30' comprises motor mounts 50A, 50B for the mounting of respective electric motors 38A, 38B such that the shaft of each motor points axially forward into the respective ducted shroud space where a hub of the respective fan wheel is attached. Electronic systems control module 16 is mounted on the exterior of the rear wall of shroud 30' at a location centrally of and above the two motors. Wiring 56A, 56B leads from module 16 to the respective motor.

Electric coolant pump module 14 is mounted on the exterior of shroud 30' on the lower wall of side discharge outlet 92. Wiring 54 extends from module 16 to module 14.

The modules 12', 14, 16, and 18 form an assembly that is installed in a vehicle by "dropping" it into the engine compartment and securing it in place, just as modules 12, 14, 16, and 18 of the first embodiment form an assembly that is "dropped" into place. Connections to engine E and radiator 19 are the same as for the first embodiment. The dual ducted fan embodiment operates in the same fashion as the first embodiment, except that the two fan wheels rotate in opposite directions so that effluent that is drawn into each frontal opening of shroud 30' exits the side discharge outlets in opposite directions, i.e. to the right and the left.

FIG. 2 also shows the optional auxiliary fan module 80 that may be a part of the total cooling assembly.

While FIG. 1 shows a single axial fan module, other embodiments may comprise dual axial fan modules side-by-side and under the control of module 16.

While a presently preferred embodiment of the invention has been illustrated and described, it should be appreciated that other constructions and embodiments may fall within the scope of the following claims.

What is claimed is:

1. A total cooling assembly for an engine, comprising:
   a heat exchanger module;
   a cooling fan module joined to said heat exchanger module, said cooling fan module having a fan and a first electric motor that operates said fan;
   a fluid pump in fluid communication with said heat exchanger module;
   a second electric motor that operates said pump; and
   a controller that selectively operates said first and second electric motors;
   wherein said cooling fan module comprises a panel structure having a walled through-passage in which said fan is disposed such that operation of said fan by said first electric motor causes an effluent to be drawn through said through-passage, and wherein said fluid pump and said second electric motor are also disposed on said panel structure.

2. The total cooling assembly as recited in claim 1, wherein said controller selectively operates said first and second electric motors based on cooling requirements of said engine.

3. The total cooling assembly as recited in claim 1, wherein said walled through-passage comprises a circular walled opening concentric with an axis of rotation of said fan, and said panel structure comprises a panel portion forming a motor mount mounting said first electric motor.

4. The total cooling assembly as recited in claim 3, wherein said panel portion comprises a configuration of struts, and
   wherein said configuration of struts, said motor mount and said panel portion are an integral one-piece construction.

5. The total cooling assembly as recited in claim 3, wherein said controller is mounted on said panel portion.

6. The total cooling assembly as recited in claim 1, wherein said pump comprises an inlet and an outlet, and said panel structure further comprises a fluid passage coupling an outlet of said heat exchanger module to said pump inlet.

7. The total cooling assembly as recited in claim 1, wherein said engine comprises an internal combustion engine in an engine compartment of an automotive vehicle, and
   wherein said engine compartment defines an air flow path through said total cooling assembly so that fluid flowing through said heat exchanger module transfers heat to air in said flow path.

8. The total cooling assembly as recited in claim 1, wherein said engine comprises a coolant passage system, a fluid passage providing fluid communication between said coolant passage system and said heat exchanger module, and an additional fluid passage providing fluid communication between said pump and said coolant passage system.

9. The total cooling assembly as recited in claim 8, wherein said heat exchanger module comprises a radiator in fluid communication with said engine and said pump by said fluid passages; and
   wherein said heat exchanger module further comprises an air conditioning condenser disposed in assembly relation with said radiator, and said radiator and condenser are disposed in tandem such that said fan draws ambient air across both said radiator and said condenser.

10. The total cooling assembly as recited in claim 1, wherein said control module selectively controls operation of said first and second electric motors for regulating power consumption thereof.

11. The total cooling assembly as recited in claim 1, further comprising at least one sensor that generates a signal indicative of an automotive vehicle operating condition for the control module to utilize in operating at least one of the first and second motors.

12. The total cooling assembly as recited in claim 11, wherein said signal is indicative of at least one of engine coolant temperature and pressure, vehicle air conditioning system refrigerant temperature and pressure, data from an engine management computer, and data from a data bus of a vehicle electronics system.

13. The total cooling assembly as recited in claim 11, wherein said control module attempts to operate said first and second electric motors in a manner which achieves targeted total convective heat transfer with minimized power consumption.

14. A method of assembling an internal combustion engine and a cooling system, comprising:
   A) providing a total cooling system assembly that defines an air flow path by assembling together on a panel structure:
      1) a heat exchanger;
      2) a cooling fan module comprising a fan and an electric motor combination; and
      3) a pump and electric motor combination;
   B) providing a controller for selectively controlling operation of said electric motors based on engine cooling requirements; and
   C) associating said total cooling assembly with an internal combustion engine by:
      1) assembling a fluid conduit to place said heat exchanger module and a coolant passage system of said engine in fluid communication;
      2) assembling another fluid conduit to place said pump and the coolant passage system of said engine in fluid communication.

15. A method of minimizing power consumption of an automotive vehicle cooling assembly, comprising:
   A) providing a total cooling system assembly that defines an air flow path by assembling together on a panel structure:
      1) a heat exchanger for transferring heat from engine coolant fluid therein to air entering an air flowpath therein;
      2) a cooling fan module comprising a fan and a first electric motor in combination, for drawing air across said heat exchanger; and
      3) a pump and second electric motor in combination, for pumping said engine coolant fluid through said heat exchanger;
   B) providing a controller for selectively controlling operation of said electric motors based on engine cooling requirements; and
   C) operating said assembly by selectively controlling operation of said first and second electric motors with said controller in a manner that minimizes power consumption thereof while regulating total convective heat transfer among said engine coolant fluid, said heat exchanger and said air.

16. The method of claim 15, further comprising the step of providing at least one sensor that generates a signal indicative of an automotive vehicle operating condition; and
   wherein said step of operating further comprises utilizing said signal by said control module for operating at least one of the first and second motors.

17. The method of claim 16, wherein said signal indicates at least one of engine coolant temperature and pressure, vehicle air conditioning system refrigerant temperature and pressure, data from an engine management computer, and data from a data bus of a vehicle electronics system.

* * * * *